Sept. 4, 1951 J. H. PALMER 2,566,904
AUTOMATIC ELECTRIC TOASTER
Filed Aug. 31, 1949 2 Sheets-Sheet 1

Inventor:
John H. Palmer,
by *Hurridanle Begi*
His Attorney.

Patented Sept. 4, 1951

2,566,904

UNITED STATES PATENT OFFICE 2,566,904

AUTOMATIC ELECTRIC TOASTER

John H. Palmer, Milford, Conn., assignor to General Electric Company, a corporation of New York Application August 31, 1949, Serial No. 113,306

6 Claims. (Cl. 99—329)

This invention relates to electric cooking apparatus and more particularly to a device for toasting slices of bread.

An object of my invention is to provide improved electric apparatus to lower automatically a bread carriage upon insertion of slices of bread into the toaster, with an adjustable control to regulate the toasting period, at the end of which the electric heaters within the toaster are automatically interrupted and the carriage raises to permit ready removal of the completed toast.

Another object of my invention is to provide an improved control for terminating the toasting operation, which control is adjustable externally of the toaster to permit the operator to obtain toast of the desired color.

Still another object of my invention is to construct a toaster with an improved automatic drive for raising and lowering a bread carriage, including an adjustable device operating in conjunction with the drive to retain the toast within the toasting chamber upon completion of the heating cycle or to raise the toast to an exposed position.

In accomplishment of the foregoing objectives, a feature of my invention consists in a drive, by a motor and reduction gearing, to lower a bread carriage into toasting position against the action of a spring normally biasing the carriage to its up or non-toasting position. The gear reduction drive from the motor also includes an adjustable stop for retaining the carriage in its down position after completion of the toasting operation in order to keep the toast warm. A control arrangement constitutes another feature of my invention for starting the motor to drive the carriage downwardly upon insertion of bread slices into toast receiving slots. A further feature of my invention consists in the use of bimetallic elements for timing the toasting operation. One bimetal strip is associated with each of the toast-receiving slots, and all of the bimetal strips must move to open their corresponding sets of contacts in order to interrupt the toasting operation.

Figure 1:
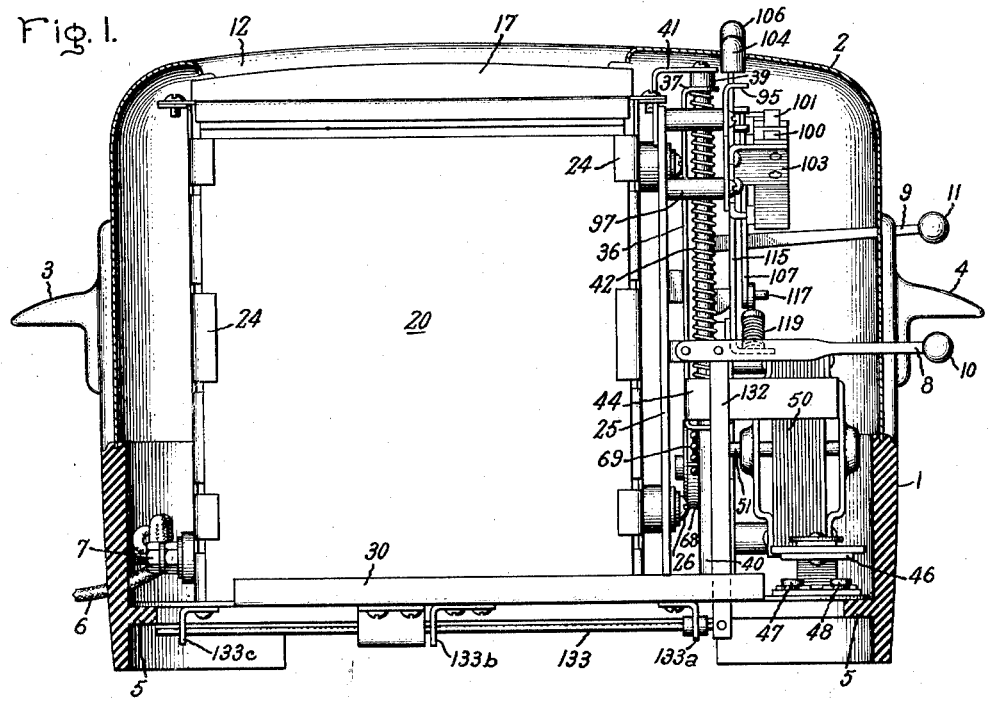
Figure 2:
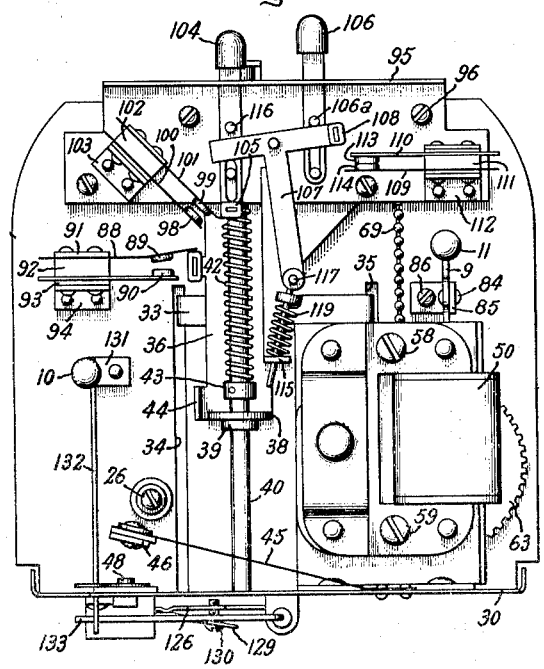
Figure 4:
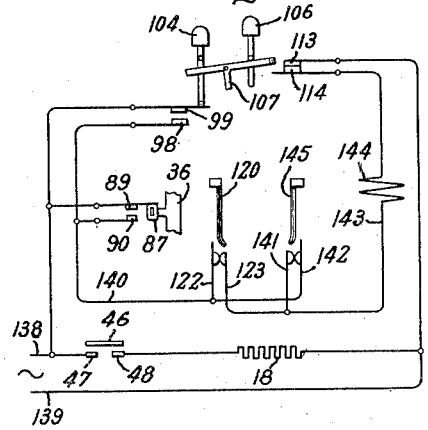
Figure 3:
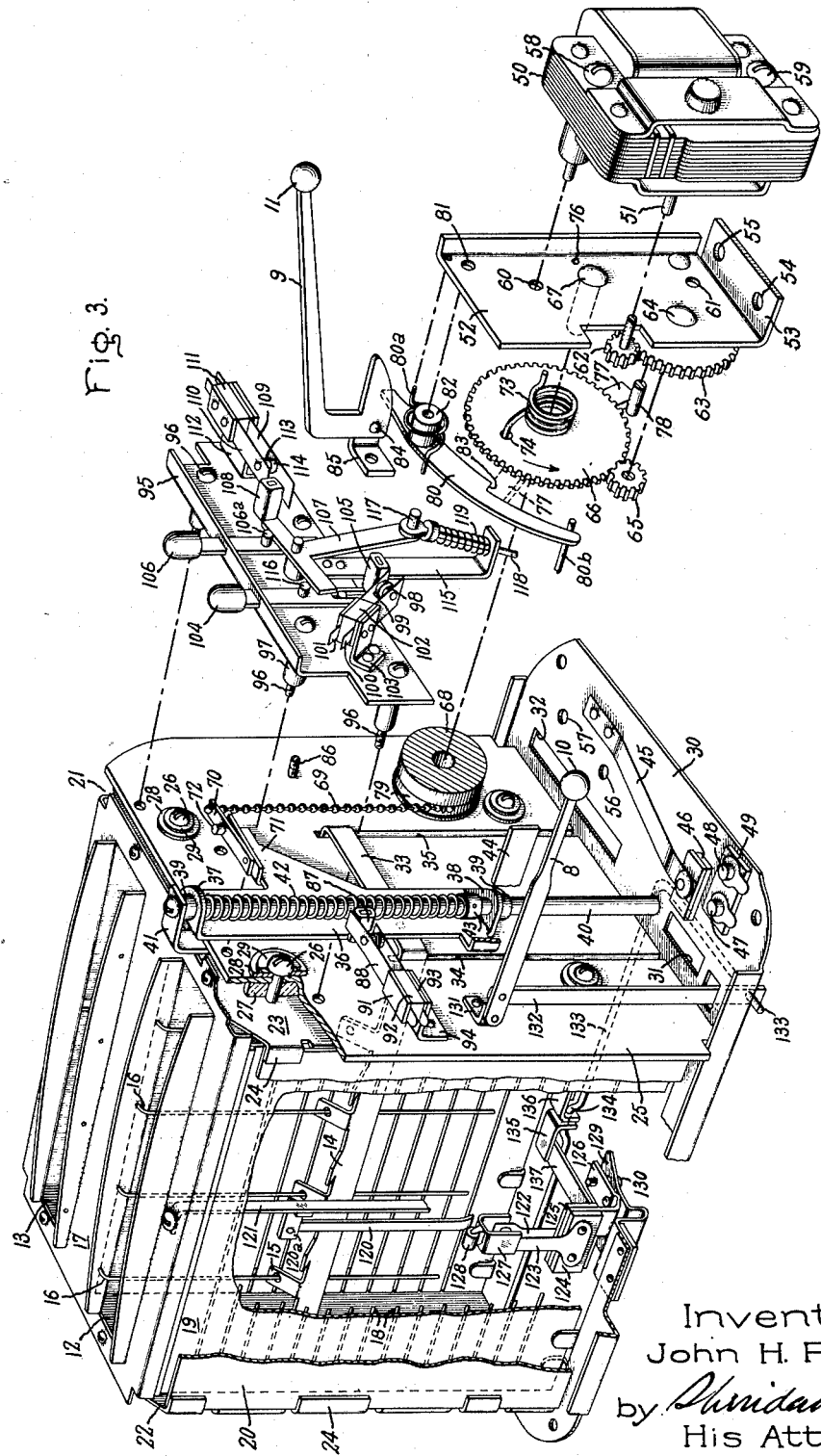

The features of my invention which I believe to be novel are set forth with particularity in the appended claims. My invention itself, however, both as to its organization and method of operation, together with further objects and advantages thereof, may best be understood by reference to the following description taken in connection with the accompanying drawings, in which Fig. 1 is a side elevation of an electric toaster arranged in accordance with this invention and having its outer toaster case in section; Fig. 2 is an end elevation with the toaster case removed to illustrate the operating mechanism; Fig. 3 is an exploded view in perspective of my improved toaster; and Fig. 4 is a schematic wiring diagram for this toaster.

Referring to the drawing, in Fig. 1 I have shown my improved toaster with an outer enclosing case comprising a plastic base portion 1 and an upper metal chromium-plated hood 2. Handles 3 and 4 may be attached to this outer casing for convenience in handling of the toaster. The lower part 1 of the exterior case includes an inwardly directed flange 5 for supporting the toaster operating mechanism above the surface on which the toaster is to rest. Electric power is supplied for operation of this device through a suitable electric cord 6 connected inside of the toaster outer casing, to appropriate terminals such as 7. Projecting from the right-hand end of the casing, as shown in Fig. 1, are a pair of levers 8 and 9 having operating knobs 10 and 11, respectively, on their outer ends. Lever 8 is the toast color control and lever 9 is the "keep warm" control. The operation of these two levers will be explained more fully at a later point in this description. A pair of slots 12 and 13 at the top of the toaster, best seen in Fig. 3, are adapted to receive slices of bread to be toasted.

The bread carriage, which is shown most clearly in Fig. 3, includes a bread supporting rack 14 in each of the toasting chambers. Each rack includes a plurality of outwardly extending ears, such as 15, upon which a slice of bread may rest, with each ear apertured to permit sliding movement of carriage 14 with respect to a plurality of guide wires 16. Guide wires 16, supported at their upper ends by a toaster top frame member 17, prevent the toast from coming into direct contact with heating element wires 18. Each heating element consists of a length of resistance wire 18 supported on a sheet 19 of mica or similar material not disintegrated by the heat during toasting. Each toasting chamber includes a pair of such heating elements so that a slice of bread is toasted evenly on both sides simultaneously. Side members 20 and 21 are placed outside of the outer pair of heating elements to enclose completely the toasting chamber and reflect heat from the heating elements inwardly, thus improving efficiency. The ends of the toasting chamber are also enclosed by end plates 22 and 23. As shown in Fig. 3, each end plate includes a plurality of ears 24 bent over to engage sides 20.

It is particularly important with this construction to separate the toasting chamber from the chamber containing the toaster operating mechanism to prevent overheating of the operating components. End plate 23 serves as a heat-reflecting barrier between these two compartments. Preferably it is of heat-reflecting metal, such as an aluminum sheet, although obviously it may be of insulating material or of other types. A heat barrier 25 is supported with respect to end plate 23 by a plurality of fastening devices, such as 26, with an insulating spacer or washer 27 on each fastening device between end plate 23 and barrier 25, as well as a pair of insulating washers 28 and 29 under each fastener head to prevent the conduction of heat to barrier plate 25. By this construction heat transfer from the toasting chamber to the mechanism compartment is effectively blocked. However, as an additional safety precaution and to preserve the life of the operating mechanism, a toaster base plate 30 is provided with a plurality of apertures, such as 31 and 32, to permit entrance of cool air from underneath the toaster into the mechanism compartment. Referring to Fig. 1, it is seen that heat barrier 25 extends from base plate 30 upwardly, but stops short at its upper end of the toaster hood 2. Hot air rising from the toasting compartment moves upwardly, drawing cool air through the mechanism compartment by chimney effect as an aid in cooling of the electric motor and other operating parts.

As explained above, toast is carried in each of the toasting compartments on a rack 14. While the present embodiment illustrates two toast receiving compartments, it is obvious that an additional number of such compartments may be employed or a toaster with a single toast slot might be used in accordance with this construction. In a toaster employing a plurality of toast-carrying racks such as 14, each rack includes an end portion extending through end plate 23 and heat barrier 25 for connection to a cross bar. In the present instance I have shown a cross bar 33 formed integrally with a pair of toast-receiving racks 14. Slots 34 and 35 are provided through end plate 23 and heat barrier 25 to permit reciprocating movement of cross bar 33 and the toast-carrying racks 14. Cross bar 33 is rigidly connected to a vertically disposed yoke 36, best seen in Figs. 2 and 3. The assembly of yoke 36, cross bar 33, and the toast-carrying racks 14 will be hereinafter referred to as the toast carriage.

Referring again to Fig. 3, yoke 36 includes on its upper and lower ends laterally extending and centrally apertured ears 37 and 38. Bushings, such as at 39, may be carried by each of these ears so that the entire carriage is slidable up and down on a carriage-supporting rod 40. Rod 40 is affixed to base plate 30 at its lower end and held in a vertical position at its upper end by an arm 41 attached to the heat barrier. Encircling the upper portion of carriage rod 40 is a helical spring 42 with its lower end positioned by a collar 43 secured to rod 40. The upper end of spring 42 is underneath the laterally extending ear 37 on yoke 36, whereby a downward movement of the carriage compresses spring 42. When the carriage is again released, spring 42 returns it to the upper or non-toasting position. On the lower end of yoke 36 is an outwardly extending arm 44 which, when the carriage is moved to its lowermost position, comes into contact with a resilient contact-carrying arm 45 attached to base plate 30. Arm 45 carries at its outer end a bridging contact 46 adapted to close the circuit through the toaster heating elements through contact buttons 47 and 48 supported on base plate 30 by an insulating bar 49. It is therefore seen that whenever the toast carriage is moved to its lowermost position, the heating element is energized. Also, when the toast carriage is held in its lowermost position, a slight upward movement permits resilient arm 45 to raise bridging contact 46 and thus break the circuit through the toaster heating element.

In accordance with this invention, it is unnecessary for the operator to depress the carriage against the action of the carriage return spring 42, inasmuch as a motor drive is provided for this purpose. Referring to Fig. 3, an electric motor 50, such as a shaded pole induction motor, having a shaft 51 is supported on a motor mounting and gear plate 52. Plate 52 has a bottom flange 53 apertured at 54 and 55 for attachment to the toaster base plate 30 through apertures 56 and 57. The motor 50 is attached to the supporting plate 52 by threaded fastening devices 58 and 59 extending through apertures 60 and 61. The outer end of motor shaft 51 carries a pinion 62, which meshes with an idler gear 63 rotatably carried by supporting plate 52 on a bearing pin 64. Idler gear 63 has affixed to it in concentric relation an idler pinion 65, which meshes with carriage drive gear 66. Carriage drive gear 66 is supported with respect to plate 52 by a bearing pin 67. This carriage drive gear carries with it during rotation a winding drum 68, the outer surface of which has connected thereto a chain 69 which, in turn, is connected to carriage yoke 36 through a spring arm 70. Spring arm 70 is adjustably connected to a laterally extending portion 71 on yoke 36, as best seen in Fig. 3. The adjustment stop 72 facilitates proper adjustment between chain 69 and the carriage. Carriage drive gear 66 is biased in a clockwise direction, corresponding to the uppermost position of the carriage, by a helical spring 73 having one end extending through an aperture 74 in gear 66 and another end 75 extending through an aperture 76 in mounting plate 52.

To limit the clockwise rotation of gear 66 under the influence of spring 73, gear 66 has connected thereto a radially extending arm 77, which is limited in its clockwise rotation by a stop pin 78 carried by supporting plate 52. When the radially extending arm 77 on gear 66 is in contact with stop pin 78, the toast carriage is in its normally up or non-toasting position. However, when power is supplied to motor 50, the gear reduction drive rotates the carriage driving gear 66 in a counterclockwise direction as shown by the arrow. This rotation also rotates drum 68 which winds the chain 69 in a groove 79 on its outer surface, thus pulling down the toast carriage and compressing carirage spring 42. At the same time, helical spring 73 between carriage drive gear 66 and supporting plate 52 is placed under torsional stress. When the carriage reaches its lowermost position, at which time bushing 39 is in contact with the toaster base plate 30, further lowering of the carriage and rotation of the reduction gearing is impossible. At this point in the operation, motor 50 is stalled. This motor preferably is designed as a torque motor that may remain in a stalled position for a period of time without damage to the motor windings, thus eliminating the need for additional motor switching devices or a de-clutching arrangement. Throughout the toast heating operation, motor 50 remains in such a stalled position. Upon completion of the heating cycle, the motor circuit is interrupted, permitting the torsional stress in spring 73 and the compressed stress in carriage spring 42 to reverse the rotation of the reduction gearing and raise the toast carriage to the up or non-toasting position.

The proportioning of the reduction gearing is such that the main carriage drive gear 66 makes slightly less than one complete revolution in driving the carriage from its upper position to its lower position. Since it is often desirable to retain the toast within the toasting chamber after completion of the toasting operation in order to keep it warm until it is desired for consumption, I provide an arrangement for limiting the return of the toast carriage to its upper position. Referring to Fig. 3, a stop lever 80 is pivotally mounted on supporting plate 52 at aperture 81. A spring 80a biases lever 80 in a counter-clockwise direction against a stop pin 80b. Lever 80 may have attached thereto a bushing 82 in order to locate this lever in a position to engage radial arm 77 affixed to the carriage driving gear. Stop lever 80 has a notch 83, whereby upon return rotation of gear 66, the radially projecting arm 77 on this gear engages in notch 83 to limit the return motion and upward movement of the carriage. However, the carriage is permitted to move upwardly a sufficient distance so that the projecting arm 44 on the carriage is free of resilient contact-carrying arm 45 to interrupt the circuit to the toaster heating element. In this position the toast remains within the toasting compartment, but the heating element is off. In such a position, the toast keeps warm from the residual heat within the toasting compartment until it is ready for consumption. The pivotal movement of the stop lever 80 is controlled by "keep warm" lever 9. Lever 9 is, in turn, pivotally mounted by a rivet 84 to an angle supporting bracket 85, which is connected to heat barrier 25 by a threaded fastening device 86, as seen in Fig. 2. With this construction, an upward movement of lever 9 results in a corresponding downward movement of the left-hand end of stop lever 80, as shown in Fig. 3, so that notch 83 is in a position to stop the return movement of stop arm 77. Therefore, when lever 9 is in its uppermost position, the toast is retained in its "keep warm" position upon completion of the toasting operation. However, when lever 9 is in its lowered position, notch 83 in the stop lever 80 is unable to interrupt the travel of radially projecting arm 77, and thus the carriage returns to its uppermost position.

From the description above, it is seen that control of the toasting operation is effected by control of the supply of electrical power to motor 50. Therefore, it is necessary to apply power to motor 50 to commence a toasting operation and this may be done in several ways, such as by mounting a separate switch at a convenient point on the toaster. In the embodiment shown, I start the toasting operation by a carriage-operated switch, whereby insertion of bread into a toast-receiving slot with a slight downward force depresses the carriage, causing motor contacts to close. Referring to Fig. 2, an insulated bushing 87 is attached to an outwardly extending ear on the carriage. Bushing 87 operates a resilient contact arm 88 carrying a movable contact 89 for movement toward and away from a fixed contact 90. These two contacts 89 and 90 are supported on arms in spaced relation between insulating blocks 91, 92, and 93 secured to an angle bracket 94 attached to heat barrier 25. With this arrangement a slight downward movement of the carriage yoke 36 permits spring arm 88 to close contacts 89 and 90 and thus start the motor 50, which continues the downward movement of the carriage until it is in a toasting position and the contacts to the main heating element are closed.

Referring to Fig. 3, I have shown an alternate arrangement for commencing the toasting operation and, in addition, a switching arrangement for interrupting the toasting operation at any point during the cycle. These switches are carried by a switch plate 95 supported in spaced relation from heat barrier plate 25 by a plurality of screws 96 and spacers 97. A starting switch comprises a pair of contact points 98 and 99 affixed to a pair of spring arms 100 and 101 which, in turn, are secured between insulating blocks 102 on an angle bracket 103. These contacts, which are normally open, may be closed by depression of a plunger operator 104 slidably carried by switch plate 95 and having on its lower end an insulating bushing 105. Contacts 98 and 99 are in parallel with contacts 89 and 90 so that closure of either set of contacts will start operation of motor 50. Obviously, either switch alone would be sufficient for this device. Also, in lieu of employing the separate switch including contacts 98 and 99, plunger operator 104 may be so arranged that its downward movement will depress the carriage to close contacts 89 and 90 and thus commence the toasting operation.

Since occasionally it is desirable to interrupt the toasting operation before the completion of a cycle, a second plunger operator 106 is provided for operation of a motor circuit interrupting switch. Plunger operator 106, which is slidably supported by switch plate 95, has a laterally extending pin 106a in operative relation with one arm of a T-shaped rocker 107. This T-shaped rocker has on one end of its head an insulated bushing 108 capable, upon its downward movement, of moving downwardly a spring contact arm 109. The movable contact arm 109 and a fixed contact arm 110 are carried between insulating blocks 111 secured to an angle bracket 112 attached to switch plate 95. Arms 109 and 110 carry contact points 113 and 114. These contact points, which are normally closed, are in the electrical circuit to motor 50. Thus, at any time during operation of motor 50 during the toasting cycle, a depression of operator 106 opens contact points 113 and 114 terminating operation of the motor and permitting the carriage to return to its non-toasting position.

To obtain a positive action of operators 104 and 106, a toggle mechanism is employed. This is shown most clearly in Fig. 3 illustrating a toggle bracket arm 115 riveted to switch plate 95. Plunger operator 104 includes a laterally extending pin 116 corresponding to pin 106a on operator 106. These pins are capable of causing a rocking movement of the T-headed rocker 107, which has a laterally projecting pin 117 at its lower end for carrying the eye of a toggle pin 118. A spring 119 is held under compression between the toggle bracket arm 115 and the eye of toggle pin 118, so that whenever one of the operators is depressed rocker 107 will pass through a center position after which the stress in spring 119 will force it to its other extreme position to raise the opposite operator.

For a toasting cycle to be performed entirely automatically, a suitable device is required for timing the toasting operation and preferably is adjustable to permit the operator to obtain light or dark toast by a simple adjustment. The timing device should also automatically compensate itself upon change of temperature within a toasting compartment. In the present embodiment, this timing operation is performed by a bimetallic element supported adjacent the toast position for each of the toast receiving slots. Referring to Fig. 3, I have shown a thermostatic timing mechanism for toast receiving slot 12, it being understood that a similar thermostatic timing arrangement is employed in connection with toast receiving slot 13. The bimetallic element 120 is carried by an angle bracket 120a secured to a vertically extending supporting bar 121 attached at its upper end to top plate 17 and at its bottom to base plate 30. Thermostat contact arms 122 and 123, which carry normally closed contacts, are supported on insulating blocks 124 and 125 secured to a pivotal bracket 126. Contact arm 123 carries at its upper end a U-shaped head 127, having attached to the top surface thereof an insulating bushing 128. The free end of bimetallic element 120, upon heating, moves outwardly into contact with bushing 128, resulting in movement of spring contact arm 123. Movement of contact arm 123 causes a separation of these thermostat contacts. When both thermostats in the two toasting compartments have opened their respective contact elements, operation of motor 50 is interrupted for cessation of the toasting operation. Since the position of bushing 128 with respect to the bimetal element is critical, I find it desirable to provide internal adjusting means within the toaster. As described above, the contact arms 122 and 123 are carried by a pivotal bracket 126 which may rock on a resilient bracket arm 129 secured to base plate 30. A screw 130 provides an adjustment between the pivotal arm 126 and the bracket arm 129 to change the relative position between bushing 128 and the bimetal element 120.

To obtain color control, the color control lever 8 is pivotally supported with respect to heat barrier 25 on a bracket 131. An upward and downward movement of lever 8 causes a corresponding movement of link 132 extending downwardly through base plate 30. Link 132 is connected to the end of a crank 133. As shown in Fig. 3, crank 133, in the form of a stiff wire, extends inwardly toward the center of the toaster underneath base plate 30, and then extends longitudinally of the toaster supported in suitable bearing brackets 133a, 133b, and 133c best shown by Fig. 1. At an intermediate point, crank 133 has an eccentric portion 134, shown by Fig. 3. Connected to this eccentric portion are a pair of operating arms 135 and 136. Operating arm 135 serves, through a connecting link 137, to change the position of the contact strip 123 and bushing 128 with respect to the bimetallic element 120. Thus, if the operator wishes darker toast, color control lever 8 is depressed causing a counterclockwise rotation of crank 133. This rotary movement results in an upward movement of operating arm 135 and its corresponding link 137 to move the contact strip assembly and bushing 128 outwardly away from the free end of the bimetallic element. Therefore, the toasting operation will have a longer duration since it will take a longer period of time for the free end of the bimetal to move the contact strip to the open circuit position. The other operating arm 136 connected to eccentric 134 operates through an extension link similar to 137, in order to control the position of the contact assembly associated with the bimetallic element for toast receiving slot 13. Therefore, with this construction a separate bimetal element may be employed for each of the toast receiving slots, and a single color control lever serves to regulate the toasting time for both. I find it preferable to connect the contacts associated with each thermostatic element in parallel, so that both sets of contacts must be open in order to interrupt operation of the motor. Such a connection permits a single slice of toast to be toasted to the desired color without a premature interruption and cessation of the toasting cycle due to the opening of the bimetallic element in the bread slot which contains no toast.

The operation of this device will be more clearly understood by a reference to the schematic wiring diagram of Fig. 4. The incoming alternating current is supplied to lines 138 and 139. Line 138 is connected to both contacts 89 and 99. Therefore, the closing of either set of contacts, 89 and 90, or 98 and 99, completes the circuit to conductor 140 leading to contacts 122 and 123 on one of the thermostat controls and contacts 141 and 142 on the other thermostat control. If either of these sets of contacts are closed, power is supplied through line 143 to the motor winding 144. The other side of the motor winding is connected through contacts 113 and 114 to the other side of the power supply line 139. The toaster heating element is connected across the line by bridging contact 46 on the toast carriage completing the circuit through contacts 47 and 48. To commence the toasting operation it is merely necessary to place a slice of bread into one of the bread-receiving slots with a slight downward pressure to cause a slight downward movement of the carriage 36. This downward movement permits closure of contacts 89 and 90 to commence operation of the motor through its winding 144. Alternately, operation of the motor may be commenced by depressing the operator 104 to close contacts 98 and 99 with the same result. If at any time during the toasting cycle it is desired to terminate the motor operation, operator 106 may be depressed to open contacts 113 and 114. If the toasting cycle is allowed to continue however, bimetallic elements 120 and 145 open both sets of contacts 122, 123 and 141, 142, thus opening the circuit to the motor to discontinue the toasting operation.

From the foregoing, it is seen that I have disclosed a new and improved automatic toaster. Operation of this device may be started merely by exertion of a slight pressure upon slices of bread inserted in the toast-receiving slots. Thereafter, an electric motor drives the carriage downward to its toasting position causing energization of the toaster heating element. The toasting cycle is automatically timed by the use of bimetallic elements positioned adjacent each slice-receiving slot, simultaneously providing automatic temperature compensation of the timing cycle. This timing system also includes an improved color control to permit the operator to adjust externally of the toaster the length of time that the heating elements are energized. Furthermore, the automatic drive is adjustable to retain toast within the toasting compartment upon completion of the heating portion of the cycle, or to raise the toast to an exposed position for ready removal. Also, an external switch operator placed at a convenient location on the toaster permits interruption of the toasting cycle at any time, after which the toast carriage is returned to its raised position.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an electric toaster, a main frame and housing enclosing the toasting chamber and supporting the operating mechanism, heating elements for the toasting chamber, a toast carriage slidably supported by said frame for reciprocating movement between toasting and non-toasting positions, resilient means biasing said carriage to its non-toasting position, an electric motor for driving said carriage from its non-toasting to its toasting position against the action of said resilient means, said motor remaining in a stalled position while said carriage is in toasting position, contacts closing a circuit through said heating elements upon movement of said carriage to toasting position, and thermostatic means for interrupting supply of power to said motor whereupon said resilient means tends to return said carriage to non-toasting position, said thermostatic means comprising a bimetallic element adjacent each toast-receiving slot within said toasting chamber, a set of normally closed contacts associated with each of said bimetallic elements movable to open position upon heat responsive motion thereof, and a color control lever operable from a point external of said toaster to change the position of engagement of each of said bimetallic elements with respect to its corresponding contacts, all of said bimetallic elements opening said contacts prior to opening of said motor circuit.

2. In an electric toaster, a main frame and housing enclosing the toasting chamber and supporting the operating mechanism, a heating element for the toasting chamber, a toast carriage slidably supported by said frame for reciprocating movement between toasting and non-toasting positions, resilient means biasing said carriage to its non-toasting position, a rotary electric torque motor drive for moving said carriage to its toasting position through a gear reduction against the action of said resilient means, contacts closing the circuit to said heating elements upon movement of said carriage to toasting position, means closing the circuit to said motor upon a slight downward movement of said carriage, said motor remaining in a stalled position when said carriage is in its toasting position, means interrupting the circuit through said motor, said means comprising thermostatically controlled switches including a separate thermostat and switch for each slice of toast carried by said carriage, and a manual switch operable from a point outside said housing, opening of said manual switch or opening of both of said thermostatically controlled switches interrupting the circuit to said motor, a stop manually movable into or out of engagement with the carriage motor drive to limit upward movement of said carriage, and adjustable means for regulating the time at which said thermostats open said motor circuit.

3. In an automatic electric toaster including a plurality of bread-receiving slots, an automatic motor drive for lowering a toast carriage to toasting position, and resilient means for returning the toast carriage to non-toasting position, a timer for regulating the period of energization of said motor comprising a bimetallic element adjacent each bread slot, a pair of contacts in the circuit to said motor associated with each bimetallic element, said contacts being normally closed when the toaster is cool whereby supply of heat to said toaster causes movement of said bimetallic elements to open said contacts, a color control lever movable from a point external of said toaster and operable through a connecting link and eccentric shaft for adjusting the position of said pairs of contacts with respect to their corresponding bimetallic elements, each pair of said contacts being connected in parallel with said other contacts whereby all of said thermostatically-controlled contacts must be open for interruption of said motor operation and return of the toast carriage to non-toasting position.

4. In an automatic electric toaster, a toast carriage slidably supported within said toaster for reciprocating movement between toasting and non-toasting positions, resilient means biasing said carriage to its non-toasting position, an electric motor for driving said carriage to toasting position against the action of said resilient means, said motor remaining in a stalled position when said carriage is in its toasting position, interruption of power to said motor permitting said resilient means to return said carriage to non-toasting position, a switch for initially starting said motor movable to closed position by a slight downward movement of said carriage, and means interrupting the supply of power to said motor, said means comprising a thermostatic element associated with each bread-receiving slot, a pair of contact elements associated with each of said thermostatic elements, means operable from a point external of said toaster for adjusting the position of each pair of contact elements with respect to its associated thermostatic element, each pair of said contacts being in a normally closed position and movable to an open position by heat responsive movement of its associated thermostatic element, opening of all of said pairs of contacts interrupting said motor circuit, and a switch manually operable from a point external of said toaster for interrupting said motor circuit at any time.

5. In an electric toaster of the automatic type having a plurality of toast-receiving slots, a carriage for supporting slices of toast and movable between non-toasting and toasting positions, a resilient element biasing said carriage to a non-toasting position, a power drive for lowering said carriage to toasting position and retaining it in such position against the action of said resilient element, a circuit including switch means for controlling said power drive and adjustable means for timing the period during which said carriage is retained in its toasting position, said adjustable means comprising a bimetallic element thermally associated with each toast-receiving slot, a set of normally closed contacts in said circuit associated with each bimetallic element and adapted to be opened by movement thereof responsive to the temperature adjacent said bread-receiving slot, each contact set being insulatingly supported on a resilient bracket, a shaft including an eccentric rotatably carried by the toaster, means interconnecting said eccentric to each of said contact sets, whereby rotation of said shaft eccentric changes the position of each contact set with respect to its associated bimetallic element, and means operable from a point external of said toaster for rotating said shaft.

6. In an automatic electric toaster having a plurality of toast receiving slots, a toast carriage movable between non-toasting and toasting positions, resilient means biasing said carriage to its non-toasting position, an electric power drive for moving said carriage to its toasting position, and an energizing circuit for said power drive, timing means for regulating the period of energization of said power drive, said timing means comprising a set of normally closed contacts for each bread receiving slot, said contacts being connected in series circuit relation with said power drive, and a thermally responsive member associated with each set of contacts in immediate proximity to the toast position, heat responsive motion of each of said thermally responsive members being adapted to open its corresponding set of contacts, movement of all of said contact sets to their open position de-energizing said power drive whereby said resilient biasing means moves said carriage to its non-toasting position.

JOHN H. PALMER.

REFERENCES CITED

The following references are of record in the file of this patent:

UNITED STATES PATENTS

| Number | Name | Date |
|---|---|---|
| Re. 21,060 | Lavenburg | Apr. 25, 1939 |
| Re. 21,333 | Malmquist | Jan. 23, 1940 |
| 1,901,402 | McCabe | Mar. 14, 1933 |
| 1,923,590 | Schlemm | Aug. 22, 1933 |
| 2,039,956 | Graham | May 5, 1936 |
| 2,165,204 | Anderson | July 11, 1939 |
| 2,182,124 | Guerra | Dec. 5, 1939 |
| 2,266,301 | Biebel | Dec. 16, 1941 |
| 2,270,327 | Mills et al. | Jan. 20, 1942 |
| 2,288,713 | Ireland | July 7, 1942 |
| 2,330,644 | Uhlrig | Sept. 28, 1943 |
| 2,344,842 | Weeks | Mar. 21, 1944 |
| 2,378,073 | Felver | June 12, 1945 |